Oct. 1, 1946.  W. E. WINE  2,408,591
DEMOUNTABLE TRACTION UNIT FOR TRACTOR WHEELS
Filed Oct. 19, 1944   2 Sheets-Sheet 2
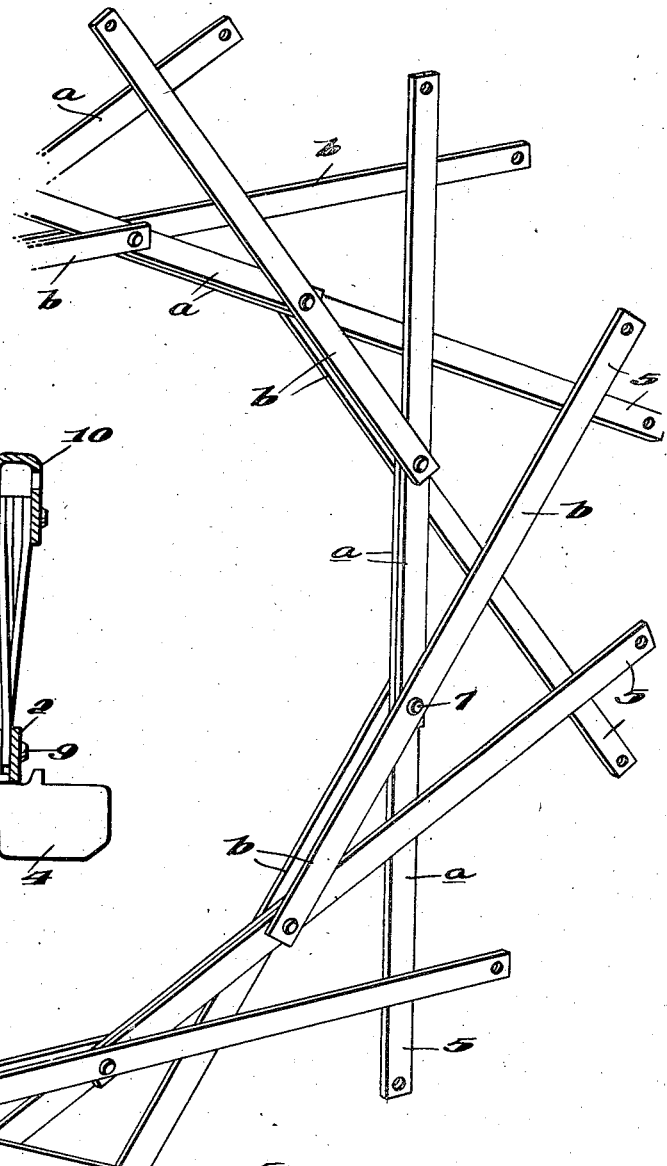
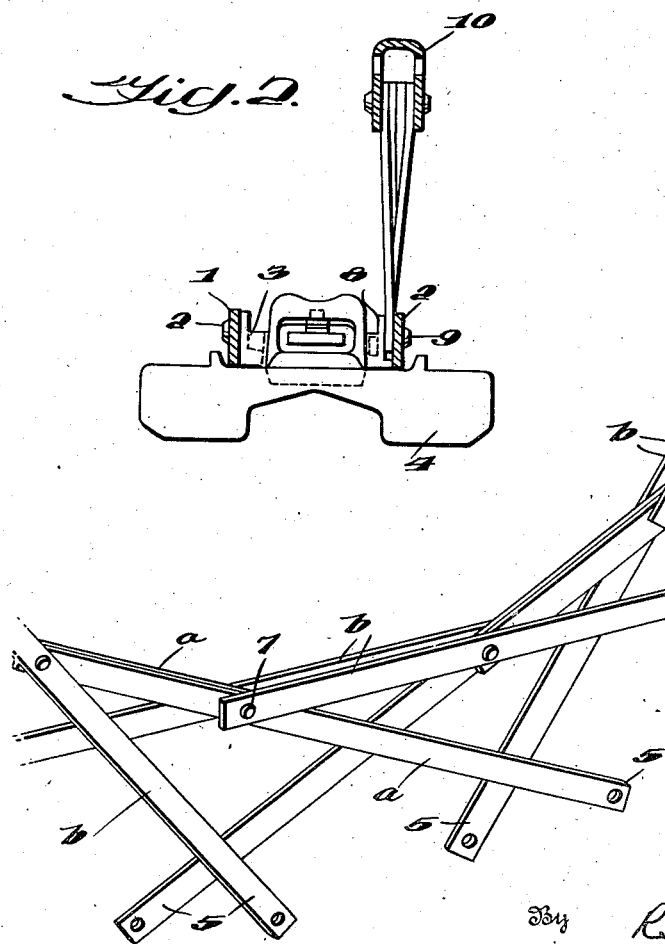

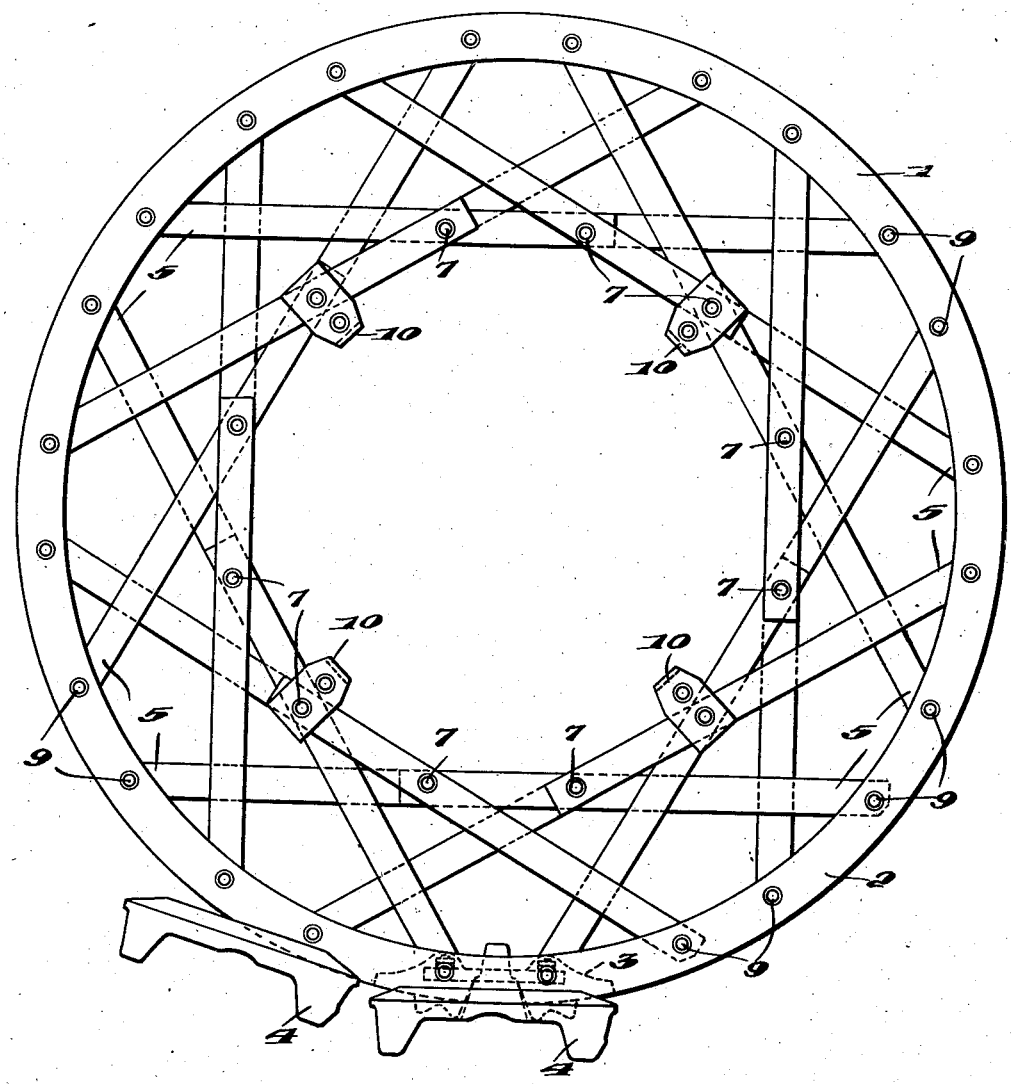

Patented Oct. 1, 1946

2,408,591

UNITED STATES PATENT OFFICE 2,408,591

DEMOUNTABLE TRACTION UNIT FOR TRACTOR WHEELS

William E. Wine, Toledo, Ohio

Application October 19, 1944, Serial No. 559,389

5 Claims. (Cl. 301—56)

My invention relates to tractor wheels and more particularly to a demountable annular traction unit adapted to form the peripheral portion of those wheels.

The principal object of the invention is to provide a demountable annular traction unit of sufficient strength and durability, and yet having the necessary inherent flexibility, which can be easily and quickly substituted for, or used in place of, the demountable rubber tires with which tractor wheels are often provided.

A primary feature of the invention consists in providing the unit with a plurality of spokes arranged like the chords of a circle within the rim of the unit and having each spoke formed of two oppositely extending members whose inner portions are rigidly connected in overlapping relation and are connected to similar portions of adjacent spokes.

Another feature of the invention consists in providing a demountable unit with substantially straight spokes all of which are connected to the rim portion of the unit adjacent one side edge thereof and in connecting wheel attaching brackets to the spokes in substantially the same plane in which the spokes are secured to the rim whereby the rim of the unit may angle with respect to the axle of the tractor wheel without permanently deforming the spokes.

Other features of the invention, residing in advantageous forms, combinations and relations of parts, will hereinafter appear and be pointed out in the claims.

In the drawings:

Figure 1 is a side elevational view of the tractor unit, all but two of the shoes with which the unit is normally provided being omitted for clarity.

Figure 2 is a transverse sectional view through one side of the tractor unit.

Figure 3 is an enlarged perspective view of some of the spokes of the unit, the rim element and the brackets for connecting the unit to the tractor wheel being omitted.

Referring more particularly to the drawings, 1 indicates the rim of the traction unit which is preferably provided with a pair of laterally spaced annular members 2. These members may be conveniently connected in spaced relation by a plurality of members 3 to which ground engaging shoes 4 may be movably connected. The specific construction of the shoes and the members 3 to which they are connected form no part of the present invention and may, if desired, be of the construction of similar members which are illustrated and described in detail in my Patent No. 2,332,037, granted October 19, 1943.

The unit has a plurality of pairs of diverging spokes 5 which are arranged within the rim like the chords of a circle, whereby both ends of each spoke may be rigidly secured to the rim. Each of the spokes is formed of two plate-like members whose inner portions are overlappingly secured together at points spaced longitudinally of the spoke. The members designated $a$ of one of the spokes of each pair have their inner portions secured in overlapping engagement, and the inner portions of the members, designated $b$, of the other spoke of each pair are secured in overlapping engagement to the outer faces of overlapping portions of the members of spokes $a$ of other pairs of spokes so that the overlapping portions of members $b$ of the spokes are maintained in spaced relation to each other. The overlapping portions of each spoke extend continuously from the overlapping portions of adjacent spokes and are rigidly connected thereto by rivets 7.

It is thus to be seen that a double thickness of the members of the spokes occurs continuously around the inner periphery of the traction unit and that increased strength and rigidity is, therefore, obtained at this point.

Each of the spokes is substantially straight and its outer ends are connected to the rim adjacent one side edge thereof, being preferably interposed between the inner face of one of the annular rim members 2 and a side wall or flange 8 of the adjacent spacing member 3 and secured by rivets 9. As may be seen from Figure 1, one of the spokes of each of the pairs of spokes is connected to one of the members 3 and the adjacent end of the other spoke of that pair is connected to the next adjacent member 3. Brackets 10 are secured to the inner peripheral portion of the traction unit for receiving any suitable means (not shown) whereby the unit may be demountably connected to a tractor wheel. The brackets are preferably connected to the unit where the spokes are secured in overlapping relation. The specific type of bracket will depend upon the particular construction of the tractor wheel on which the unit is to be mounted and its location on the unit will be controlled by this factor. The construction of the unit, however, is such that brackets may be disposed in a great variety of arrangements and still be connected to the unit by the rivets which connect adjacent spokes.

As the spokes are substantially straight, the tractor wheel connecting brackets are secured to them in a plane which is located adjacent one of the side edges of the rim whereby practically the entire rim extends, or is disposed, on one side of the spokes and the bracket 10, instead of the conventional spoke-wheel construction where the spokes are connected to both side edges of the rim. With all the spokes being connected to only one side edge portion of the unit, the rim may angle with respect to the axle of the wheel on which it is mounted to accommodate itself to the ground conditions encountered without permanently deforming the spokes. Such flexibility is not possible in wheel structures having spokes which extend to both side edges of the rim. The double thickness of the plate members of the spokes at the periphery of the unit affords the necessary rigidity and strength without decreasing the flexibility of the structure as a whole.

By employing relatively straight spokes which, of course, may be slightly bent to overlap other spokes, the unit may be assembled with much greater facility than has been possible in assembling other demountable traction units. The outer ends of the spokes need not be initially placed in the same plane during assembling. Moreover, any inaccuracy in different parts of the structure may often be compensated for by slightly bending one or more of the spokes.

Various modifications may, of course, be made in the details of construction illustrated and described without departing from the spirit and scope of the appended claims.

What I claim is:

1. A demountable annular traction unit adapted to form the peripheral portion of a tractor wheel, said unit comprising a rim portion, and a plurality of spokes arranged within said rim portion as the chords of a circle, each of said spokes consisting of two plate-like members having their inner portions secured together in overlapping relation and the overlapping portions of the members of each spoke being secured in overlapping relation to the overlapping portions of the members of an adjacent spoke, and means respectively connected to the overlapping portions of the members of some of said spokes adapted to receive means for connecting the unit to the tractor wheel.

2. A demountable annular traction unit adapted to form the peripheral portion of a tractor wheel, said unit comprising a rim portion, and a plurality of spokes arranged within said rim portion as the chords of a circle, each of said spokes consisting of two members having their inner portions secured together in overlapping relation and their outer ends respectively secured to said rim portion, the overlapping portions of the members of each spoke being secured together at points spaced longitudinally of the spoke and being secured to the overlapping portions of the members of two adjacent spokes, and brackets connected to the overlapping portions of the members of some of said spokes adapted to receive means for connecting said unit to the tractor wheel.

3. A demountable annular traction unit adapted to form the peripheral portion of a tractor wheel, said unit comprising a rim portion and a plurality of pairs of diverging spokes arranged within said rim portion as chords of a circle, each of said spokes consisting of two plate-like members having their inner portions connected together in overlapping relation and their outer ends respectively connected to said rim portion, the members of one spoke of each of said pairs of spokes being interposed between the overlapping portions of the members of one spoke of an adjacent pair and the members of the other spoke of each of said pairs overlapping the outer faces of the overlapping portions of the members of a spoke of still a different pair of spokes, and brackets connected to the spokes adapted to receive means whereby said unit may be secured to the tractor wheel.

4. A demountable annular traction unit adapted to form the peripheral portion of a tractor wheel, said unit comprising a rim portion and a plurality of pairs of diverging spokes arranged within said rim portion as the chords of a circle, each of said spokes consisting of two plate-like members having their inner portions connected together in overlapping relation and their outer ends respectively connected to said rim portion, the overlapping portions of one of the spoke members of each of said pairs extending continuously between the overlapping portions of spoke members of adjacent pairs of spokes, and brackets connected to said spokes for receiving means to connect said unit to the tractor wheel.

5. A demountable annular traction unit adapted to form the peripheral portion of a tractor wheel, said unit comprising a rim having a pair of laterally spaced rigidly connected annular members, a plurality of substantially straight spokes connected to one of said annular members and arranged as chords of a circle with respect thereto, each of said spokes consisting of two oppositely extending plate-like members having their inner portions secured together in overlapping relation, the overlapping portions of the members of each spoke being secured to corresponding portions of the members of adjacent spokes, and brackets disposed substantially in the plane of said last named annular member and secured to the overlapping portions of the members of some of said spokes for receiving means to connect said unit to the tractor wheel.

WILLIAM E. WINE.